(12) United States Patent
Dolinskiy et al.

(10) Patent No.: US 9,399,209 B2
(45) Date of Patent: Jul. 26, 2016

(54) CATALYST FOR THE OXIDATIVE CONVERSION OF HYDROCARBON GASES TO PRODUCE CARBON MONOXIDE AND HYDROGEN

(71) Applicant: OBSHCHESTVO S OGRANICHENNOY OTVETSTVENNOST'YU "GAZOHIM TECHNO", Moskovskaya obl. (RU)

(72) Inventors: Sergey Erikovich Dolinskiy, Moscow (RU); Nikolay Yakovlevich Usachev, Moscow (RU); Andrey Mikhaylovich Pleshakov, Moscow (RU)

(73) Assignee: OBSHCHESTVO S OGRANICHENNOY OTVETSTVENNOST'YU "GAZOHIM TECHNO", Moskovskaya (RU)

( * ) Notice: Subject to any disclaimer, the term of this patent is extended or adjusted under 35 U.S.C. 154(b) by 0 days.

(21) Appl. No.: 14/443,627

(22) PCT Filed: Aug. 7, 2013

(86) PCT No.: PCT/RU2013/000684
§ 371 (c)(1),
(2) Date: May 18, 2015

(87) PCT Pub. No.: WO2015/005819
PCT Pub. Date: Jan. 15, 2015

(65) Prior Publication Data
US 2015/0290629 A1    Oct. 15, 2015

(30) Foreign Application Priority Data

Jul. 10, 2013 (RU) ................. 2013131817

(51) Int. Cl.
| | |
|---|---|
| *B01J 21/00* | (2006.01) |
| *B01J 21/04* | (2006.01) |
| *B01J 23/00* | (2006.01) |
| *B01J 23/02* | (2006.01) |
| *B01J 23/08* | (2006.01) |
| *B01J 23/10* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 23/58* | (2006.01) |
| *B01J 20/00* | (2006.01) |
| *B01J 23/89* | (2006.01) |
| *B01J 21/02* | (2006.01) |
| *B01J 21/06* | (2006.01) |
| *B01J 21/10* | (2006.01) |
| *B01J 23/46* | (2006.01) |
| *C01B 3/40* | (2006.01) |

(52) U.S. Cl.
CPC .............. *B01J 23/8946* (2013.01); *B01J 21/02* (2013.01); *B01J 21/06* (2013.01); *B01J 21/10* (2013.01); *B01J 23/002* (2013.01); *B01J 23/10* (2013.01); *B01J 23/40* (2013.01); *B01J 23/42* (2013.01); *B01J 23/44* (2013.01); *B01J 23/46* (2013.01); *B01J 23/894* (2013.01); *C01B 3/40* (2013.01); *B01J 2523/00* (2013.01); *C01B 2203/0233* (2013.01); *C01B 2203/0244* (2013.01); *C01B 2203/0261* (2013.01); *C01B 2203/107* (2013.01); *C01B 2203/1064* (2013.01); *C01B 2203/1082* (2013.01)

(58) Field of Classification Search
CPC .......... B01J 21/04; B01J 21/06; B01J 21/066; B01J 21/10; B01J 21/12; B01J 21/14; B01J 23/02; B01J 23/10; B01J 23/40; B01J 23/42; B01J 23/44; B01J 23/46; B01J 23/54; B01J 23/58; B01J 23/63; B01J 23/892; B01J 23/894; B01J 23/8946
USPC ................. 502/258, 259, 263, 304, 327, 328, 502/332–335, 339, 349, 355, 415, 439
See application file for complete search history.

(56) References Cited

U.S. PATENT DOCUMENTS

| | | | |
|---|---|---|---|
| 5,130,114 A | 7/1992 | Igarashi | ........................ 423/652 |
| 5,336,655 A * | 8/1994 | Basini | ...................... B01J 23/40 502/251 |
| 5,783,607 A * | 7/1998 | Chaumette | ............... B01J 23/75 502/302 |
| 6,037,307 A * | 3/2000 | Campbell | .......... B01D 53/8603 502/304 |

(Continued)

FOREIGN PATENT DOCUMENTS

| | | |
|---|---|---|
| RU | 2248932 | 3/2005 |
| RU | 2362739 | 7/2009 |

OTHER PUBLICATIONS

International Search Report, PCT/RU2013/000684, Mar. 11, 2014.

*Primary Examiner* — Cam N. Nguyen
(74) *Attorney, Agent, or Firm* — Matthew A. Pequignot; Pequignot + Myers LLC

(57) ABSTRACT

The catalyst may be used to obtain hydrogen or synthesis gas for chemical industry in processes of partial oxidation, steam reforming, and autothermal reforming of a hydrocarbon feed. The catalyst of oxidative conversion of gaseous hydrocarbons to form carbon monoxide and hydrogen contains platinum-group metals and an oxide composition and characterized in that the platinum-group metals include Pt, Pd, and Rh and the oxide composition is obtained from a mixture of a sol of Al, Si, and Zr hydroxides with particles of Ni, Mg and/or Ce oxides with a size of 5-30 nm, that were obtained by spray-pyrolysis of a solution of Ni, Mg and/or Ce salts.

3 Claims, No Drawings

(56) References Cited

U.S. PATENT DOCUMENTS

| | | | | |
|---|---|---|---|---|
| 6,180,075 B1 * | 1/2001 | Lindner | ................ | B01D 53/945 423/213.2 |
| 6,288,295 B1 * | 9/2001 | Didillon | ................... | B01J 23/40 502/325 |
| 6,342,465 B1 * | 1/2002 | Klein | ................... | B01J 37/0248 502/325 |
| 6,413,904 B1 * | 7/2002 | Strehlau | ............. | B01D 53/9422 502/327 |
| 6,602,820 B1 * | 8/2003 | Gobel | ............... | B01D 53/9422 423/213.2 |
| 6,878,667 B2 * | 4/2005 | Gaffney | ............... | B01J 23/8946 502/241 |
| 7,541,310 B2 * | 6/2009 | Espinoza | ................ | B01J 21/12 502/260 |
| 8,318,633 B2 * | 11/2012 | Fujie | ........................ | B01J 23/63 502/302 |
| 8,475,755 B2 * | 7/2013 | Dang | ................... | B01D 53/864 423/240 S |
| 8,530,372 B2 * | 9/2013 | Luo | ...................... | B01D 53/945 502/303 |
| 8,545,780 B1 * | 10/2013 | Chen | .................... | B01D 53/945 423/213.2 |
| 8,722,001 B2 * | 5/2014 | Ono | ........................ | B01D 53/945 423/213.5 |
| 8,835,346 B2 * | 9/2014 | Gramiccioni | ........ | B01J 37/0242 423/213.2 |
| 9,034,269 B2 * | 5/2015 | Hilgendorff | ......... | B01J 37/0244 422/170 |
| 2012/0258857 A1 | 10/2012 | Pham et al. | ................... | 502/328 |

* cited by examiner

CATALYST FOR THE OXIDATIVE CONVERSION OF HYDROCARBON GASES TO PRODUCE CARBON MONOXIDE AND HYDROGEN

RELATED APPLICATION DATA

This application is the national stage entry of International Appl. No. PCT/RU2013/000684, filed Aug. 7, 2013, which claims priority to Russian Patent Application No. 2013131817, filed Jul. 10, 2013. All claims of priority to that application are hereby made, and that application is hereby incorporated in its entirety by reference.

FIELD OF THE INVENTION

This invention relates to catalysts being used for oxidative conversion of hydrocarbon gases in processes of their partial oxidation, steam reforming, and autothermal reforming to produce hydrogen or synthesis gas for the chemical industry.

BACKGROUND OF THE INVENTION

The metals of group VIII of the periodic table of elements, deposited on porous supports, usually high-melting oxides, are used as catalysts of oxidative conversion of hydrocarbons to form mainly CO and $H_2$. Reactions of free oxygen oxidation of hydrocarbons in processes of partial oxidation and autothermal reforming are highly exothermic that can result in local overheating of a catalyst and decreasing of its activity, therefore porous supports, in turn, may be armored by heat-conducting structural elements in order to increase heat conductivity of a catalyst and its durability. There are foamed metals, metallic foil, metallic lattice (RU2204434, RU2248932, RU2292237, RU2320408) that are used as heat-conducting structural elements.

Catalyst activity and a buildup of deactivating carbon deposits on its surface depend on the nature and dispersion of active components, the peculiarities of their activation and stabilization while interacting with supports' components, and stability of the structure under conditions of feed conversion. At the same time, support porosity and its adhesion to the heat-conducting elements should be sufficient for maintaining of catalyst durability necessary for its industrial application.

It is obvious that, all other conditions being equal, catalyst systems with high dispersion of active components stabilized on the support surface and experiencing a low rate of coalescence of active particles have the advantage. On the other hand, stability of support is necessary to provide sufficient porosity and durability of a catalyst while in service.

The task of creating of an active and stable catalyst of oxidative conversion of hydrocarbons to form carbon monoxide and hydrogen is being solved by combining active components, a support composition, a method for the production of an oxide composition in order to achieve high dispersion of active particles in a thermostable oxide matrix.

The known methods for production of metal/support catalysts usually allow to obtain nano-sized active particles distributed throughout a support in different ways.

Those methods that use solutions of active components (different variations of impregnation) allow to obtain clusters of active components sized from several nanometers to 150 nm, though evaporation of a solvent when drying a support leads to irregular distribution of an active component precursor on support particles, forming relatively large particles of active components. Using of the sol-gel process to obtain an oxide mixture allows to achieve more homogeneous distribution of nano-sized particles.

The U.S. Pat. No. 5,130,114 catalyst (prototype) for steam reforming of hydrocarbons comprises a support—zirconia, a main active component—Rh and/or Ru, and a cocatalyst—at least one element from Ni, Cr, Mg, Ca, Y group of elements and some other rare-earth elements.

High activity of the catalyst and a low rate of coking is associated with the properties of zirconia used as the support. However, in the description it is allowed to use zirconia mixed or composed with some other supports—$SiO_2$, $Al_2O_3$, zeolite. A porous support may be deposited on a metallic base.

A support may be partially stabilized by $CeO_2$, MgO, $Y_2O_3$ oxides and obtained as a mixture of zirconia and stabilizing elements by any known method. In the invention description the deposited particles of hydroxides of support and cocatalyst compositions have a size of 0.03 µm. A deposition was dried and calcinated; active elements—platinum-group metals—were then being deposited on precipitated and probably formed support from solutions and colloidal dispersions of their compounds by impregnation, and then the catalyst was calcinated at temperatures of 500-850° C. in a flow of air or nitrogen and subjected to a reducing treatment. The catalyst was used for steam reforming of hydrocarbons at temperatures of 300-950° C., pressure up to 50 ATMG, steam/carbon ratio of 3-12 mole/mole, feed space velocity (FSV) of 1000-40000 hrs$^{-1}$. There are the results of catalyst testing in steam reforming of n-butane at a temperature of 450° C., $H_2O$/n-butane ratio of 12, factor of contact time of 622.76 g of the catalyst min/mole n-butane. Conversion of butane achieved 71-75%, the catalyst displayed enhanced activity and stability.

There are different methods of achieving homogeneity of distribution of catalyst active particles on a support. For example, a method for catalyst production disclosed in U.S. Pat. No. 6,103,660 is based on achieving slow-speed homogeneous deposition of particles of an active component precursor on support particles: a solution of the active component precursor was brought into a support particles suspension with the help of the capillary injection with continuous stifling. As a support it was used $\gamma$-$Al_2O_3$ or a mixture of $\gamma$-$Al_2O_3$, stabilized by lanthanum and mixed Ce/Zr oxide with Ce, Zr, Ba acetates deposited on it.

In EP1759764 a hydrocarbon decomposition catalyst represents active metal particles (noble metals, as well as Cr, Mn, Ti, Cu, Co, V and some others, 0.025-10% wt. of the catalyst) with a size of 0.5-50 nm deposited on particles of a calcinated support with a size of 0.05-0.4 µm by any known method (deposition, impregnation, equilibrium adsorption and others). The support contains main components—Mg, Al, Ni (0.1-40% wt. of a catalyst), Si (0.001-20% wt. of a catalyst) in the form of mixed oxides. The support was obtained with the help of thermal decomposition of a hydroxide mixture being formed in alkaline environment from water-soluble salts and oxides (Si—from sodium silicate). Nickel particles may have a size of 1-20 nm.

The described catalyst features a low rate of carbon conglomeration even at 1-6 mole/mole steam/hydrocarbons proportion in the feed, relatively high durability allowing it to withstand coking without being destroyed, stability, and decreased yield of ammonia from nitrogen impurities in the feed. When treating propane on the bead catalyst at a temperature of 700° C., pressure of 0.5 MPa, FSV of 50000 hrs$^{-1}$ (residence time of 0.072 sec), $H_2O$/C ratio=3 the conversion rate of propane to CO and $CO_2$ was approximately 82%.

Patent application US20120258857 discloses a method for production of an autothermal reforming catalyst in the form of particles of magnesium, nickel, and aluminium mixed oxides, which includes sol-gel synthesis of a precursor of layered Mg, Ni, and Al hydroxides from solutions of salts of the corresponding metals, its drying, at least partial decomposition at temperatures of 500-600° C. and reduction in $H_2$—$N_2$ environment at temperatures of 450-700° C. to form nano-sized particles. Such catalyst features a slow rate of coking, high activity.

SUMMARY OF THE INVENTION

Technical task—production of an active, stable, and durable catalyst for oxidative reforming of gaseous hydrocarbons to form carbon monoxide and hydrogen—is being solved by obtaining active particles and a support of the proposed composition. In this case, particles of metal oxides produced by spray pyrolysis of corresponding salts were used for nano-sized dispersion of catalyst particles.

The catalyst of oxidative conversion to form carbon monoxide and hydrogen containing platinum-group metals and an oxide composition differs in the fact that platinum-group metals include Pt, Pd, and Rh and the oxide composition is obtained from a mixture of a sol of Al, Si, and Zr hydroxides with particles of Ni, Mg and/or Ce oxides with a size of 5-30 nm obtained by spray pyrolysis of a solution of Ni, Mg and/or Ce salts.

The next composition of the catalyst (in mole percent of total amount of the elements listed below) is preferable: Pd, Pt, Rh 0.5-2, Al 20-60, Si 20-45, Zr 2-10, Ni 5-25, Mg 3-7 and/or Ce 3-6.

BEST MODE OF INVENTION IMPLEMENTATION

The preferred variant to use the catalyst—is in the form of a porous layer on a heat-resistant metallic lattice. An oxide composition of the catalyst is obtained with the help of thermal-steam treatment of a deposited on that lattice mixture of gel of Al, Si, and Zr hydroxides with nano-sized particles of Ni, Mg and/or Ce oxides.

The preparation of the catalyst includes the following stages:

1. Preparation of mixed sol/gel from an aqueous gel of aluminium hydroxide/oxide and zirconyl nitrate.
2. Preparation of a water sol of orthosilicic acid by hydrolysis of tetraalkylorthosilicate.
3. Preparation of a mixture of Ni, Mg and/or Ce oxides by spray pyrolysis.
4. Preparation of a homogeneous mixture of a sol of Al, Si, and Zr hydroxides with oxide particles of a determined formulation.
5. Forming of a porous oxide coating on a matrix-type support: deposition of the homogeneous mixture on the matrix-type support, drying, thermal-steam treatment.
6. Deposition on the porous oxide coating of the matrix-type support at least one of the next platinum-group metals: Pd, Pt, Rh.

EXAMPLES OF INVENTION IMPLEMENTATION

Examples of preparation of catalysts in accordance with the proposed invention and their employment for oxidative conversion of gaseous hydrocarbons.

Example 1

Preparation of Catalyst Samples

To prepare mixed aluminium-zirconium sol/gel, an aqueous gel of aluminium hydroxide/oxide of pseudo-boehmitic type that is nitrate-ammoniac technology-produced in commercial scale (OST 010701-401022-81) was peptized by an acidic (due to hydrolysis) agent, namely zirconyl nitrate dihydrate. Zirconium salt was added in mechanical agitator to 1000 g of an aqueous aluminium hydroxide/oxide paste, that is equivalent to 250.0 g of anhydrous aluminium oxide, and the mass was being stirred at room temperature during 2-3 hrs. To the mass obtained 175.0 g of carbamide was added while stirring to produce the homogeneous paste of mixed aluminium-zirconium sol/gel. Water was being added while stirring to obtain the mass of a required viscosity.

A sol of orthosilicic acid was obtained by hydrolysis of tetraethylorthosilicate (tetraethoxysilane) by an acidic solution of a surface-active substance (SAS). The acidic solution was obtained by adding 200 mg of SAS (sodium dodecyl- or laurylsulfonate) to 500 ml of an aqueous solution of nitric acid with concentration of 50 mmol $HNO_3/l$. As a SAS it may also be used lauryltrimethylammonium chloride, cetylpyridinium chloride, numbered Tweens and polyethylene glycols with a molecular weight of 1000 and higher. Thus prepared, the acidic solution was mixed up with tetraethoxysilane with a volume-to-volume ratio of (2-3):1 to obtain a sol of orthosilicic acid.

Aqueous dispersion of aluminium oxyhydroxide peptized by zirconium salt was added while stifling to the obtained sol of orthosilicic acid to obtain a sol of silicoaluminozirconium. A percentage proportion of Al, Si, and Zr in the catalyst was determined by amounts of aluminium oxyhydroxide, zirconyl nitrate, and the sol of orthosilicic acid taken for the preparation of the sol of Al, Si, and Zr oxyhydroxides.

A mixture of Ni, Mg and/or Ce oxides was produced by spray pyrolysis of a solution of corresponding salts. Synthesis of powders of mixed oxides with component sizes in the range of 5-30 nm is detailed in the following review: P. F. Miguel, J. L. Katz, in: W. R. Moser (Ed.), Advanced Catalysts and Nanostructured Materials, Academic Press, New York, 1996, p. 479.

An initial work solution containing a nickel salt and other necessary ingredients was sprayed by air through a nozzle directly into a burner flame fed with utility gas and compressed air.

The work solution was obtained by dissolving of weighted amounts of nickel, magnesium and/or cerium nitrates and polyethylene glycol with a molecular weight of 1000 in an aqueous solution containing 60% vol. of acetone or 2-propanol. In this case the total concentration of the dissolved salts was of 10-15% wt. and the quantity of polyethylene glycol was equal to 50-60 g per 1 liter of an aqueous solution of acetone. The percentage proportion of the salts in the work solution corresponds to the required percentage proportion of Ni, Mg, and Ce in the catalyst.

The work solution was sprayed into a burner flame with a temperature of 1100-1200° C. with a flow rate of 30-35 ml/min and the air flow rate of 40 l/min. A powdery mixture of oxides being formed as a result of decomposition of the salts was collected with the help of a cyclone filter with pore size of 10-20 μm.

The particle sizes were determined from data obtained via X-ray phase analysis performed on the Dron-3M diffractometer (CuKa radiation, nickel filter) at a scanning rate of 1 deg/min within 2θ angle range of 5-50° by Rietveld analysis performed with the help of RIETAN 2000 software [F. Izumi, T. Ikeda, Mater. Sci. Forum, 2000, 198, 321.]. The average particle sizes of samples of the oxide mixture were calculated by the Scherrer equation [J. R. Anderson Structure of Metallic Catalysts, Academic Press, 1975]. The particle sizes in the samples were found to fall in the range of 5-30 nm.

The catalyst mass was obtained by mixing up estimated amounts of the sol of Al, Si, and Zr hydroxides prepared with a determined percentage proportion of the components with powder of Ni, Mg and/or Ce oxides obtained from the work solution with the determined percentage proportion of the corresponding salts. The catalyst mass was being stirred during 2-3 hours till it became homogeneous.

Catalyst pellets were formed from the catalyst mass with the help of extrusion. The catalyst was air-cured, dried and calcinated at a temperature of 500-600° C. during 5 hours.

A catalyst layer on a heat-resistant metallic lattice was obtained as follows. A heat-resistant steel lattice of wire 0.32-0.50 mm thick with mesh width from 0.5×0.5 mm to 1.0×1.0 mm was annealed in a methane-air flame until the lattice became dark-brown. Round work parts were punched out with the help of a cutting die, and one half of them were rolled down between toothed rolls to achieve the effective thickness of the work parts of 1.2-1.5 mm. The lattice work parts were steeped into the catalyst mass and then air-dried during 12 hours. The thickness of the dried layer of the catalyst mass was of 30-60% of the wire thickness of the steel lattice. Then the dried lattices with the catalyst mass on them were placed into a furnace and heated to a temperature of 600° C. at a temperature increase rate of approximately 100° C./hour in an air flow, and also at a temperature of 350° C. injection of 100% water steam into the air flow was started and continued until a temperature of 600° C. was achieved, whereafter injection of steam was ceased and the furnace was left for cooling down.

It should be noted that in X-ray spectra of the freshly prepared catalyst with matrix-type metallic support calcinated in air at a temperature of 900° C. as well as of the catalyst after a run in conditions of high-temperature oxidative reactions of methane to form synthesis gas there appeared spectral lines peculiar to mullite. At the same time, the catalysts featured high durability, they hardly could be spalled from the metallic lattice.

At least one of the Pd, Pt, Rh platinum-group metals was deposited on the porous coating of the heat-resistant metal lattice in the amount of 0.5-2.0% mole from total amount of the metal elements and Si in the catalyst. For impregnation salt solutions with a concentration of 0.5-1.5% wt. and containing compounds of palladium ($Pd(NH_3)_4Cl_2$), platinum ($H_2[PtCl_6]\cdot 6H_2O$), and rhodium ($H_3[RhCl_6]$) were used. Impregnation was carried out at room temperature during 24 hours for the platinoid compounds to be adsorbed in pores of the catalyst layer. The catalyst then was dried and air-calcinated at a temperature of 300° C.

Activation of catalyst pellets and catalyst lattices to form nano-sized particles of platinoids was held directly in a reactor in a flow of synthesis gas ($H_2/CO=2$ mole/mole) with a linear speed of 0.5 m/min and temperature increase from 25° C. to 120° C. during 1 hour.

Table 1 shows the calculated composition of the obtained catalysts in mole percent of the total amount of the indicated elements.

Example 2

Testing of Catalysts in Process of Oxidative Conversion of Methane by Atmospheric Oxygen A flow of methane/air mixture ($O_2/C=0.50$ mole/mole) was preliminarily heated within the reactor by a thermoelectric heater preceding the mouth of the electrically heated contact zone of 10 cm³ filled with a set of horizontally oriented catalyst lattices (volume 10 cm³, weight 8 g) or mixture of quartz sand with 7 cm³ of catalyst pellets with a size of 2.0-2.8 mm obtained from extrudates. Contact conditions between a feed and a catalyst were: pressure of approximately 0.1 MPa, contact time of 0.08 sec., experiments' duration of 100 hours. Reaction began at a temperature of 300-400° C., however the temperature in the catalyst layer achieved 800-950° C. The results of testing of the catalysts in the process of oxidative conversion of methane/air gaseous mixture are shown in Table 2.

TABLE 1

Composition of catalysts prepared in accordance with Example 1

| No. of catalyst | Content, % mole | | | | | | |
|---|---|---|---|---|---|---|---|
| | Ni | Al | Zr | Si | Mg | Ce | Me |
| 1 | 25 | 20 | 10 | 35.5 | 3 | 6 | 0.5 (Pd) |
| 2 | 15 | 35 | 8 | 32 | 5 | 4 | 1 (Pd) |
| 3 | 5 | 60 | 3 | 27 | — | 3 | 1 (Pd)(1Pt) |
| 4 | 8 | 53.5 | 5 | 24 | 4 | 5 | 0.5 (Rh) |
| 5 | 14 | 25 | 9 | 45 | — | 6 | 1 (Rh) |
| 6 | 22 | 23 | 7 | 34 | 7 | 5 | 1.5 (Rh) 0.5 (Pd) |
| 7 | 25 | 42 | 5.5 | 20 | — | 6 | 0.5 (Pt) |
| 8 | 7 | 51 | 2 | 29 | 5 | 5 | 1 (Pt) |
| 9 | 5 | 42 | 5 | 39 | 3 | 4 | 2 (Pt) |
| 10/3 | 5 | 60 | 3 | 27 | — | 3 | 1 (Pd)(1Pt) |
| 11/4 | 8 | 53.5 | 5 | 24 | 4 | 5 | 0.5 (Rh) |
| 12/6 | 22 | 23 | 7 | 34 | 7 | 5 | 1.5 (Rh) 0.5 (Pd) |

TABLE 2

Conversion of methane and selectivity of CO and $H_2$ formation

| Catalyst | Methane conversion, % | Selectivity of CO formation, % | Selectivity of $H_2$ formation, % |
|---|---|---|---|
| 1 | 91 | 93 | 89 |
| 2 | 96 | 92 | 93 |
| 3 | 94 | 91 | 92 |
| 4 | 92 | 93 | 95 |
| 5 | 91 | 90 | 87 |
| 6 | 91 | 90 | 92 |
| 7 | 91 | 90 | 91 |
| 8 | 93 | 91 | 89 |
| 9 | 92 | 93 | 90 |
| 10/3 | 97 | 91 | 92 |
| 11/4 | 97 | 94 | 95 |
| 12/6 | 96 | 91 | 92 |

TABLE 3

Steam reforming of propane

| Catalyst | Propane conversion, % | Composition of dry gas, % mole | | | |
|---|---|---|---|---|---|
| | | $CH_4$ | $H_2$ | CO | $CO_2$ |
| 10/3 | 100 | 1.1 | 65.7 | 26.0 | 7.2 |
| 11/4 | 100 | 1.3 | 65.0 | 24.7 | 9.0 |
| 12/6 | 99 | 1.5 | 66.0 | 26.2 | 6.3 |

INDUSTRIAL APPLICABILITY

The results obtained show that all the catalysts feature high activity (methane conversion of 91-97%) and selectivity to hydrogen (87-95%) and carbon monoxide (more than 90%) in the process of partial oxidation of methane.

Example 3

Testing of Catalysts in Process of Steam Reforming of Propane

The catalyst samples 10/3, 11/4, and 12/6 were tested in the process of steam reforming of propane in the reactor described in Example 2. Contact conditions between a feed and a catalyst were: pressure of approximately 0.15 MPa, temperature of 650° C., contact time of 0.08 sec., experiments' duration of 72 hours, ratio $H_2O/C$ of 3 mole/mole. The product composition was determined chromatographically. The results of testing are shown in Table 3. The catalysts demonstrate high activity in steam conversion of propane with trace amounts of methane being formed.

The invention claimed is:

1. A catalyst for the oxidative conversion of hydrocarbon gases to produce carbon monoxide and hydrogen comprising:
   platinum-group metals, and
   an oxide composition;
   wherein the platinum-group metals include one or more of Pt, Pd, and Rh, and
   wherein the oxide composition is obtained from a sol of a mixture of Al, Si, and Zr hydroxides with particles of one or more of Ni, Mg and Ce oxides with a size of 5-30 nm.

2. The catalyst according to claim 1, comprising in mole percent of total amount of the following elements:
   one or more of Pd, Pt, and Rh 0.5-2,
   Al 20-60,
   Si 20-45,
   Zr 2-10,
   Ni 5-25, and
   Mg 3-7 and/or Ce 3-6.

3. The catalyst according to claim 1, wherein the oxide composition is obtained in the form of a porous coating on a heat-resistant metallic lattice with the mixture of the sol of hydroxides with the particles of oxides deposited on the lattice.

* * * * *